(12) United States Patent
Chen et al.

(10) Patent No.: US 6,327,151 B1
(45) Date of Patent: Dec. 4, 2001

(54) LOCKING DEVICE FOR LOCKING A DISK DRIVE MODULE INSIDE A COMPUTER HOUSING

(75) Inventors: Ying-Hu Chen; Chung-Kao Lai; Po-An Lin, all of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/421,693

(22) Filed: Oct. 20, 1999

(51) Int. Cl.[7] ............................ H05K 7/12; H05K 7/00
(52) U.S. Cl. .................. 361/726; 361/747; 361/685; 361/683; 292/164; 70/38 A
(58) Field of Search ....................... 361/726, 685, 361/679, 683, 725, 732, 740, 747, 686, 731; 360/97.01, 98.01, 137, 137 D; 312/332.1, 333; 369/75.1–82; 292/132, 175, 145, 163, 164; 70/38 A, 38 C

(56) References Cited

U.S. PATENT DOCUMENTS

| | | | |
|---|---|---|---|
| 1,823,303 | * | 9/1931 | Way ..................................... 292/228 |
| 3,724,889 | * | 4/1973 | Dooley ................................... 292/87 |
| 4,806,815 | * | 2/1989 | Honma ................................. 310/307 |
| 4,896,777 | * | 1/1990 | Lewis ..................................... 211/41 |
| 5,077,722 | * | 12/1991 | Geist et al. ........................... 369/75.1 |
| 5,117,661 | * | 6/1992 | Carl et al. ................................ 70/14 |
| 5,305,180 | * | 4/1994 | Mitchell et al. ....................... 361/685 |
| 5,355,272 | * | 10/1994 | Kung ..................................... 360/137 |
| 5,526,226 | * | 6/1996 | Katoh et al. .......................... 361/680 |
| 5,785,393 | * | 7/1998 | Park .................................... 312/223.2 |
| 5,831,820 | * | 11/1998 | Huang ................................... 361/686 |
| 5,868,013 | * | 2/1999 | Julien ................................... 70/38 A |
| 5,896,273 | * | 4/1999 | Varghese et al. ..................... 361/724 |
| 6,008,992 | * | 12/1999 | Kawakami ............................ 361/726 |
| 6,134,116 | * | 10/2000 | Hoss et al. ............................ 361/747 |

FOREIGN PATENT DOCUMENTS

0337399 * 10/1989 (EP) .

* cited by examiner

*Primary Examiner*—Leo P. Picard
*Assistant Examiner*—Anatoly Vortman
(74) *Attorney, Agent, or Firm*—Pillsbury Winthrop LLP

(57) ABSTRACT

A locking device is adapted for locking a disk drive module inside a computer housing. The computer housing confines an open-ended receiving space that receives slidably and removably the disk drive module therein. The computer housing has a bottom wall and an upright side wall that extends upwardly from the bottom wall and that borders the receiving space. The side wall is formed with a latch hole for access to the receiving space. The disk drive module has a casing that is formed a latch groove. The locking device includes a latch member, a resilient metal wire strip and a positioning unit. The latch member has a locking end portion and a connecting end portion, is adapted to be disposed on top of the bottom wall, and is movable between a locking position, where the locking end portion is adapted to extend through the latch hole and into the latch groove, and a releasing position, where the locking end portion is extracted from the latch groove. The wire strip has opposite arm portions and an intermediate portion connected to the connecting end portion of the latch member. The positioning unit is adapted to be provided on the bottom wall of the computer housing and abuts against the arm portions of the wire strip so as to enable the wire strip to bias the latch member to the locking position.

3 Claims, 5 Drawing Sheets

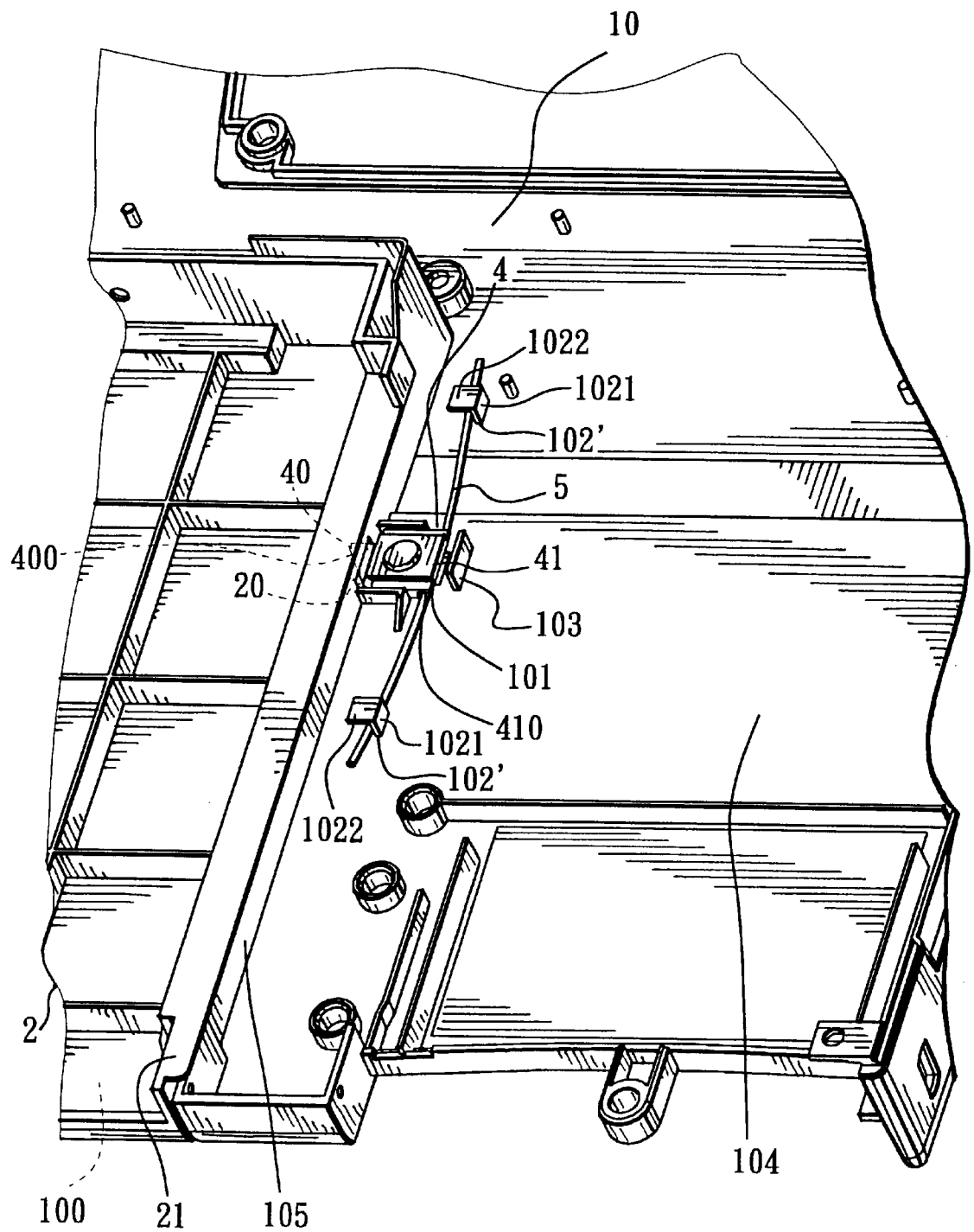
F I G. 5

LOCKING DEVICE FOR LOCKING A DISK DRIVE MODULE INSIDE A COMPUTER HOUSING

BACKGROUND OF THE INVENTION

1. Field of the Invention

The invention relates to a locking device, more particularly to a locking device for locking a disk drive module inside a computer housing.

2. Description of the Related Art

Referring to FIGS. 1 and 2, a conventional locking device is used to lock a disk drive module 2 inside a computer housing 10. The computer housing 10 confines an open-end receiving space 100 for receiving slidably and removably the disk drive module 2 therein. The computer housing 10 has a bottom wall 105 formed with a through hole 101, and an upright side wall 105 that is formed with a latch hole 1051 for access to the receiving space 100. The disk drive module 2, such as a compact disk drive module or a hard disk drive module, has a casing 21 that is formed with a latch groove 20. The latch groove 20 is registered with the latch hole 1051 when the disk drive module 2 is fully extended into the receiving space 100. The conventional locking device is disposed on the bottom wall 104, and includes a latch unit 3 and two positioning pieces 102. The latch unit 3 has a locking end portion 30 formed with an inclined face 301, and a positioning end portion 31 opposite to the locking end portion 30. The locking end portion 30 can extend through the latch hole 1051 and into the latch groove 20 for locking the disk device module 2 onto the computer housing 10. Opposite curved resilient arm portions 32 are connected integrally to the positioning end portion 31, and abut against the positioning pieces 102, respectively, so as to enable the arm portions 32 to bias the locking end portion 30 of the latch unit 3 into the latch groove 20.

Since the arm portions 32 are formed integrally with the latch unit 3, which is made of plastic, after a period of use, the arm portions 32 easily experience elastic fatigue and deformation, thereby resulting in an unstable locking and unlocking effect between the latch unit 3 and the disk drive module 2.

SUMMARY OF THE INVENTION

Therefore, the object of the present invention is to provide a locking device for locking stably a disk drive module inside a computer housing.

According to the present invention, a locking device is adapted for locking a disk drive module inside a computer housing. The computer housing confines an open-ended receiving space that extends in a first direction and that receives slidably and removably the disk drive module therein. The computer housing has a bottom wall and an upright side wall that extends upwardly from the bottom wall and along the first direction and that borders the receiving space. The side wall is formed with a latch hole for access to the receiving space. The disk drive module has a casing that is formed a latch groove. The latch groove is registered with the latch hole when the disk drive module is fully extended into the receiving space. The locking device comprises a latch member, a resilient metal wire strip and a positioning unit.

The latch member has a locking end portion and a connecting end portion opposite to the locking end portion. The latch member is adapted to be disposed on top of the bottom wall of the computer housing, and is movable in a second direction transverse to the first direction between a locking position, where the locking end portion of the latch member is adapted to extend through the latch hole and into the latch groove for locking the disk drive module onto the computer housing and for preventing removal of the disk drive module from the receiving space, and a releasing position, where the locking end portion of the latch member is extracted from the latch groove for unlocking the disk drive module from the computer housing and for permitting the removal of the disk drive module from the receiving space.

The wire strip has opposite arm portions and an intermediate portion connected to the connecting end portion of the latch member.

The positioning unit is adapted to be provided on the bottom wall of the computer housing and abuts against the arm portions of the wire strip so as to enable the wire strip to bias the latch member to the locking position.

BRIEF DESCRIPTION OF THE DRAWINGS

Other features and advantages of the present invention will become apparent in the following detailed description of the preferred embodiment with reference to the accompanying drawings, of which:

FIG. 5 is a fragmentary enlarged perspective view of FIG. 4.

DETAILED DESCRIPTION OF THE PREFERRED EMBODIMENT

Figure 1:
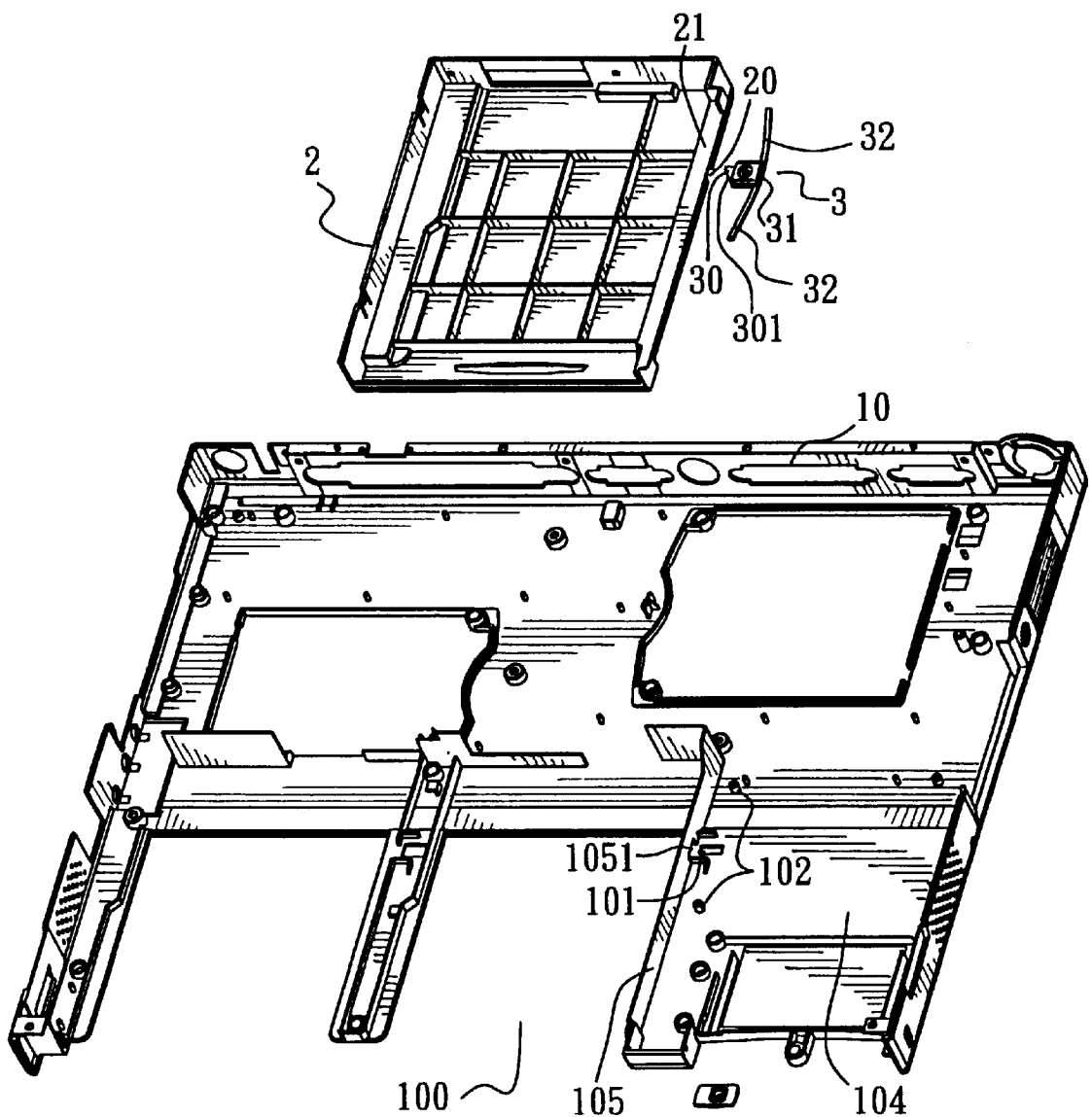
FIG. 1 is an exploded perspective view showing a conventional locking device for locking a disk drive module inside a computer housing.
Figure 2:
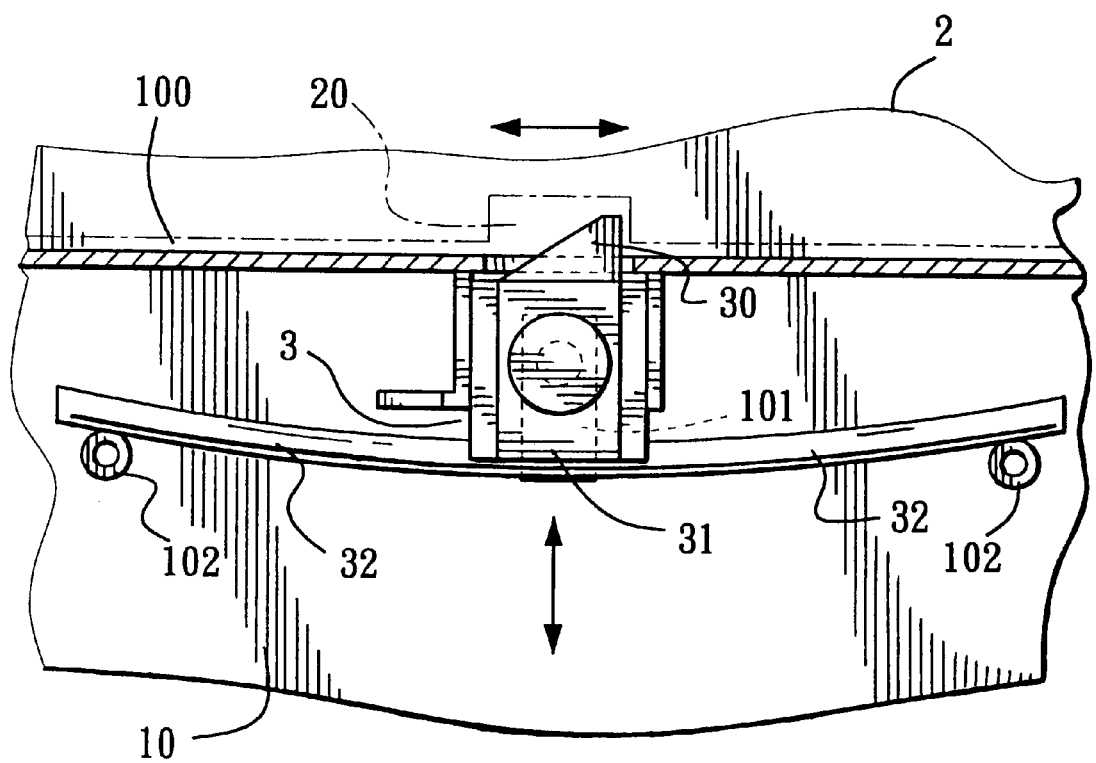
FIG. 2 is a top view of the conventional locking device after locking the disk drive module inside the computer housing in FIG. 1.

Before the present invention is described in greater detail, it should be noted that like elements are denoted by the same reference numerals throughout the disclosure.

Figure 3:
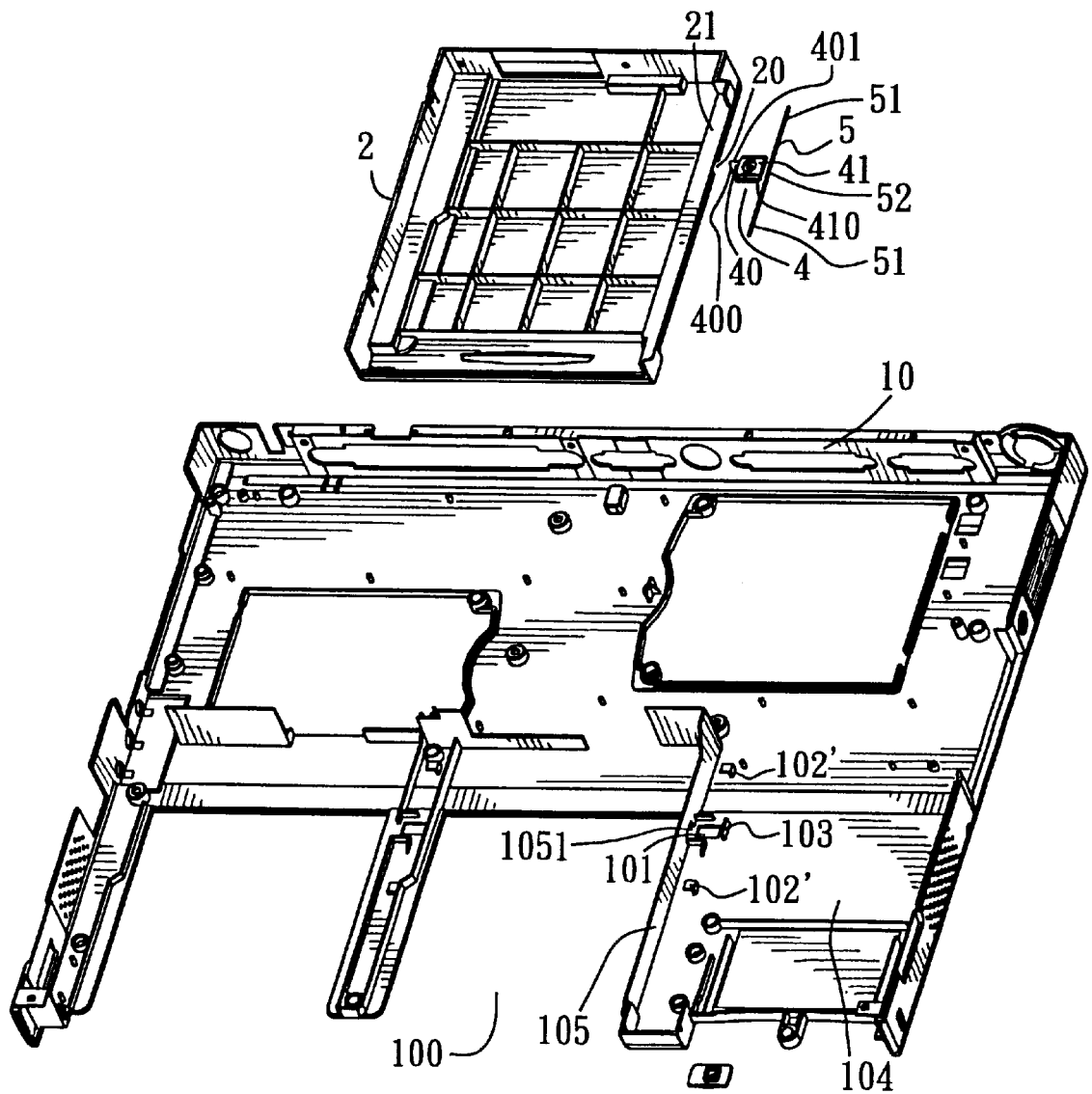
FIG. 3 is an exploded perspective view showing the preferred embodiment of a locking device for locking a disk drive module inside a computer housing according to the present invention.
Figure 4:
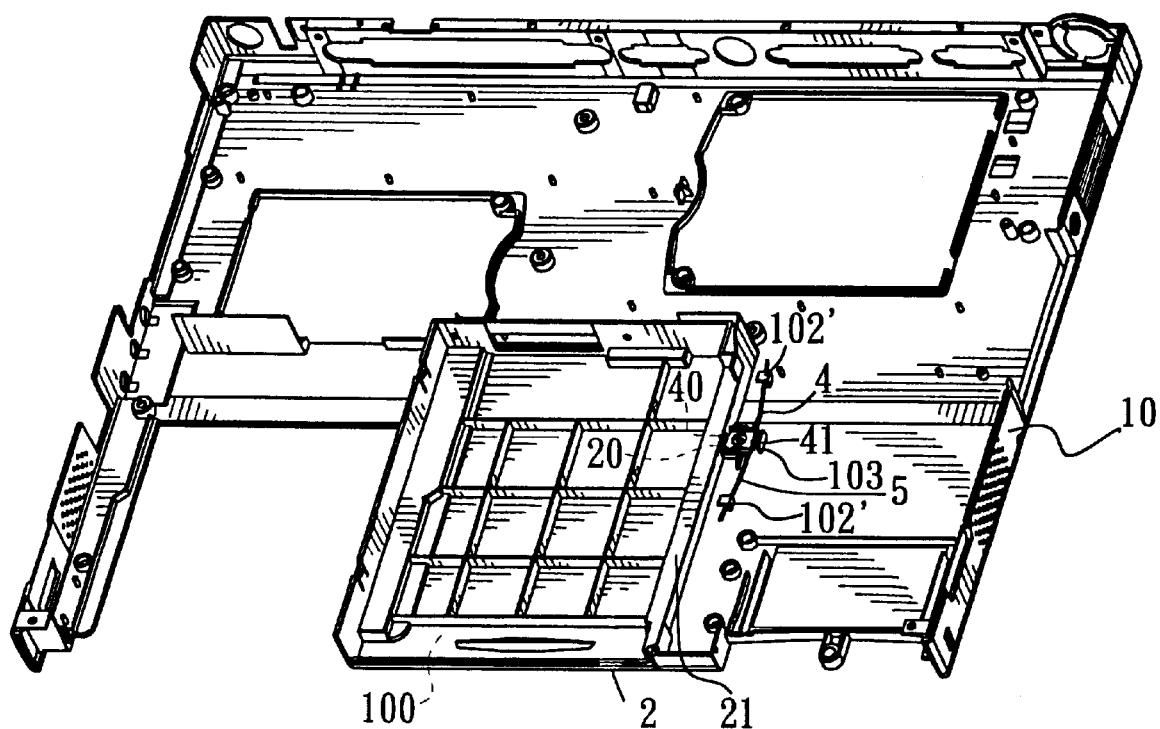
FIG. 4 is a perspective view of the preferred embodiment after assembly.

Referring to FIGS. 3 to 5, according to the preferred embodiment of the present invention, a locking device is shown to be adapted for locking a disk drive module 2, such as a compact disk drive module or a hard disk drive module, inside a computer housing 10. The computer housing 10 confines an open-ended receiving space 100 that extends in a first direction and that receives slidably and removably the disk drive module 2 therein. The computer housing 10 has a bottom wall 104 and an upright side wall 105 that extends upwardly from the bottom wall 104 and along the first direction and that borders the receiving space 100. The side wall 105 is formed with a latch hole 1051 for access to the receiving space 100. The disk drive module 2 has a casing 21 that is formed a latch groove 20. The latch groove 20 is registered with the latch hole 1051 when the disk drive module 2 is fully extended into the receiving space 100. The locking device includes a latch member 4, a resilient metal wire strip 5 and a positioning unit.

The latch member 4 has a locking end portion 40 and a connecting end portion 41 opposite to the locking end portion 40. The latch member 4 is adapted to be disposed on top of the bottom wall 104 of the computer housing 10, and is movable in a second direction transverse to the first direction between a locking position, where the locking end portion 40 of the latch member 4 is adapted to extend through the latch hole 1051 and into the latch groove 20 for locking the disk drive module 2 onto the computer housing 10 and for preventing removal of the disk drive module 2 from the receiving space 100, and a releasing position, where the locking end portion 40 of the latch member 4 is extracted from the latch groove 20 for unlocking the disk drive module 2 from the computer housing 10 and for permitting the removal of the disk drive module 2 from the receiving space 100. The locking end portion 40 has an inclined face 400 adapted to permit sliding movement of the disk drive module 2 into the receiving space 100, and a movement restricting face 401 opposite to the inclined face 400 and adapted to arrest sliding movement of the disk drive module 2 outwardly of the receiving space 100. The connecting end portion 41 is formed with an engaging groove 410.

The wire strip 5 has opposite arm portions 51, and an intermediate portion 52 connected to the connecting end portion 41 of the latch member 4. The intermediate portion 52 is received in and engages fittingly with the engaging groove 410.

The positioning unit is adapted to be provided on the bottom wall 104 of the computer housing 10 and abuts against the arm portions 51 of the wire strip 5 so as to enable the wire strip 5 to bias the latch member 4 to the locking position. The positioning unit includes a pair of positioning pieces 102' spaced apart from each other in the first direction. Each of the positioning pieces 102' has an upright portion 1021 that is adapted to extend upwardly from the bottom wall 104, and a horizontal portion 1022 that extends from the upright portion 1021 in the second direction toward the side wall 105 and that is adapted to form a clearance with the bottom wall 104 for extension of a respective one of the arm portions 51 of the wire strip 5 therethrough.

An upright stop plate 103 is adapted to be provided on the bottom wall 104 of the computer housing 10. The stop plate 103 is adapted to be disposed parallel to and spaced apart from the side wall 105 so as to limit movement of the latch member 4 to the releasing position.

A knob (not shown) is disposed on a bottom side of the latch member 4, and extends downwardly and outwardly through a through hole 101 formed in the bottom wall 104 of the computer housing 10 between the side wall 105 and the stop plate 103. The knob can be operated to move the latch member 4 from the locking position to the releasing position.

Because the wire strip 5 is made of metal, it possesses good resiliency even after a long period of use. Thus, the disk drive module 2 can be locked stably inside the computer housing 10 and can be easily released from the receiving space 100 when desired. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A locking device for locking a disk drive module inside a computer housing, the computer housing confining an open-ended receiving space that extends in a first direction and that receives slidably and removably the disk drive module therein, the computer housing having a bottom wall and an upright side wall that extends upwardly from the bottom wall and along the first direction and that borders the receiving space, the side wall being formed with a latch hold for the receiving space, the disk drive module having a casing that forms a latch groove, the latch groove being registered with the latch hole when the disk drive module is fully extended into the receiving space, said locking device comprising:

a latch member having a locking end portion and a connecting end portion opposite to said locking portion, said latch member being disposed on top of the bottom wall of the computer housing and being movable in a second direction transverse to the first direction between a locking position, where said locking end portion of said latch member extends through the latch hole and into the latch groove for locking the disk drive module onto the computer housing and for preventing removal of the disk drive module from the receiving space, and a releasing position, where said locking end portion of said latch member is extracted from the latch groove for unlocking the disk drive module from the computer housing and for permitting the removal of the disk drive module from the receiving space;

a resilient metal wire strip having opposite arm portions and an intermediate portion connected to said connecting end portion of said latch member; and a positioning unit provided on the bottom wall of the computer housing and abutting against said arm portions of the wire strip so as to enable said wire strip to bias said latch member to the locking position wherein, said connecting end portion of said latch member is formed with an engaging groove for fitting engagement with said intermediate portion of said wire strip.

2. A locking device for locking a disk drive module inside a computer housing, the computer housing confining an open-ended receiving space that extends in a first direction and that receives slidably and removably the disk drive module therein, the computer housing having a bottom wall and an upright side wall that extends upwardly from the bottom wall and along the first direction and that borders the receiving space, the side wall being formed with a latch hold for the receiving space, the disk drive module having a casing that forms a latch groove, the latch groove being registered with the latch hole when the disk drive module is fully extended into the receiving space, said locking device comprising:

a latch member having a locking end portion and a connecting end portion opposite to said locking portion, said latch member being disposed on top of the bottom wall of the computer housing and being movable in a second direction transverse to the first direction between a locking position, where said locking end portion of said latch member extends through the latch hole and into the latch groove for locking the disk drive module onto the computer housing and for preventing removal of the disk drive module from the receiving space, and a releasing position, where said locking end portion of said latch member is extracted from the latch groove for unlocking the disk drive module from the computer housing and for permitting the removal of the disk drive module from the receiving space;

a resilient metal wire strip having opposite arm portions and an intermediate portion connected to said connecting end portion of said latch member; and a positioning unit provided on the bottom wall of the computer housing and abutting against said arm portions of the wire strip so as to enable said wire strip to bias said latch member to the locking position, wherein said positioning unit includes a pair of positioning pieces spaced apart from each other in the first direction, each of said positioning pieces having an upright portion that extends upwardly from the bottom wall, and a horizontal portion that extends from said upright portion in the second direction toward the side wall to form a clearance with the bottom wall for extension of a respective one of said arm portion of said wire strip therethrough.

3. A locking device for locking a disk drive module inside a computer housing, the computer housing confining an open-ended receiving space that extends in a first direction and that receives slidably and removably the disk drive module therein, the computer housing having a bottom wall and an upright side wall that extends upwardly from the bottom wall and along the first direction and that borders the receiving space, the side wall being formed with a latch hold for the receiving space, the disk drive module having a casing that forms a latch groove, the latch groove being registered with the latch hole when the disk drive module is fully extended into the receiving space, said locking device comprising:

a latch member having a locking end portion and a connecting end portion opposite to said locking portion, said latch member being disposed on top of the bottom wall of the computer housing and being movable in a second direction transverse to the first direction between a locking position, where said locking end portion of said latch member extends through the latch hole and into the latch groove for locking the disk drive module onto the computer housing and for preventing removal of the disk drive module from the receiving space, and a releasing position, where said locking end portion of said latch member is extracted from the latch groove for unlocking the disk drive module from the computer housing and for permitting the removal of the disk drive module from the receiving space;

a resilient metal wire strip having opposite arm portions and an intermediate portion connected to said connecting end portion of said latch member;

a positioning unit provided on the bottom wall of the computer housing and abutting against said arm portions of the wire strip so as to enable said wire strip to bias said latch member to the locking position; and a upright stop plate on the bottom wall of the computer housing, said stop plate being parallel to and spaced apart from the side wall so as to limit movement of said latch member to the releasing position.

* * * * *